(12) United States Patent
Chang et al.

(10) Patent No.: US 7,202,943 B2
(45) Date of Patent: Apr. 10, 2007

(54) OBJECT IDENTIFICATION USING QUANTUM DOTS FLUORESCENCE ALLOCATED ON FRAUNHOFER SOLAR SPECTRAL LINES

(75) Inventors: Shoude Chang, Ottawa (CA); Ming Zhou, Ottawa (CA)

(73) Assignee: National Research Council of Canada, Ottawa (CA)

( * ) Notice: Subject to any disclaimer, the term of this patent is extended or adjusted under 35 U.S.C. 154(b) by 347 days.

(21) Appl. No.: 10/793,748

(22) Filed: Mar. 8, 2004

(65) Prior Publication Data

US 2005/0195386 A1 Sep. 8, 2005

(51) Int. Cl.
*G06K 9/74* (2006.01)
(52) U.S. Cl. ........................................... 356/71
(58) Field of Classification Search ............... None
See application file for complete search history.

(56) References Cited

U.S. PATENT DOCUMENTS 4,694,297 A    9/1987  Sewards (Continued)

OTHER PUBLICATIONS

Han, Mingyong et al: Quantum-dot-tagged microbeads for multiplexed optical coding of biomolecules; Nature Biotechnology;Jul. 2001;p. 631-635; vol. 19;US.

(Continued)

*Primary Examiner*—Michael P. Stafira
(74) *Attorney, Agent, or Firm*—Cassan Maclean

(57) ABSTRACT

An optical based identification system that is easily deployable and can be used in broad daylight. Fluorescent semiconductor nanocrystals (quantum dots) that fluoresce at specific wavelengths are distributed in a suitable polymer. The resulting mixture can then be applied as paint or on an adhesive label for application to a portion of any equipment or member of a friendly unit. The system also has a corresponding detectional processing unit which may be mounted on ordnance or on any other equipment such as aircraft. The detection unit uses a laser, which when active, causes a laser beam to strike the paint or adhesive able applied to the friendly unit. This causes the quantum dots to fluoresce. The fluorescence of the quantum dots can be detected by the sensor portion of the detection/processing unit. The sensor portion then transmits the data generated by the detected fluorescence to a data processing portion detection/processing unit such as a corresponding signal to the equipment operator or, if the unit is mounted on ordnance that has been launched to the warhead to deactivate the warhead. To overcome the effects of broad daylight on an optical system, the quantum dots can be detected by the sensor portions of the detection/processing unit. The sensor portion then transmits the data generated by the detected fluorescence to a data processing portion which decodes the data. If the decoded data indicates a friendly unit, the detection/processing unit sends a corresponding signal to the equipment operator or, if the unit is mounted on ordnance that has been launched to the warhead to deactivate the warhead. To overcome the effects of broad daylight on an optical system, the quantum dots are engineered to fluoresce at wavelengths corresponding to the absorption lines of the solar spectrum, more commonly known as Fraunhofer lines.

14 Claims, 3 Drawing Sheets

U.S. PATENT DOCUMENTS

| | | | |
|---|---|---|---|
| 4,851,849 A | 7/1989 | Albersdoerfer | |
| 5,966,227 A | 10/1999 | Dubois et al. | |
| 6,252,664 B1* | 6/2001 | Barbera-Guillem | 356/417 |
| 6,501,091 B1* | 12/2002 | Bawendi et al. | 257/14 |
| 6,633,370 B2* | 10/2003 | Lawandy | 356/71 |
| 2002/0031783 A1* | 3/2002 | Empedocles et al. | 435/7.1 |
| 2003/0218746 A1* | 11/2003 | Sampas | 356/318 |
| 2003/0231304 A1* | 12/2003 | Chan et al. | 356/301 |
| 2004/0066510 A1* | 4/2004 | Hoff et al. | 356/317 |

OTHER PUBLICATIONS

Chan, Warren et al: Luminescent quantum dots for multiplexed biological detection and imaging; Current Opinion in Biotechnology; 2002; p. 40-46: US.

Chang, Shoude et al; Information coding and retrieving using . . . semiconductor nanocrystals for object identification; Optics Express; Jan. 2004; p. 143-148; vol. 12, No. 1, US.

* cited by examiner

OBJECT IDENTIFICATION USING QUANTUM DOTS FLUORESCENCE ALLOCATED ON FRAUNHOFER SOLAR SPECTRAL LINES

FIELD OF THE INVENTION

The present invention relates to identification systems and, more specifically, relates to optical identification systems which may be used in broad daylight in both military and civilian applications.

BACKGROUND TO THE INVENTION

From the time man first engaged in organized combat, one of the issues he has faced has been the identification of friendly forces. Prior to the widespread use of drab coloured uniforms for low visibility, brightly coloured uniforms were used to identify one group of soldiers from another. However, this practice has, for obvious reasons, fallen into disuse. The problem of identifying friendly from unfriendly forces, however, remains.

One area in which this problem is critical, if not potentially fatal, is in the delivery of ordnance. The rise of so-called "smart weapons" has increased the accuracy of ordnance delivery, but, sadly, has also increased the casualty rates of so-called "friendly fire" incidents. In the first Persian Gulf conflict of the early 1990s, US Defence Department analysis identified a staggering 49% of all US casualties as stemming from friendly fire. Because of such reports, the US Defence Department conducted extensive research into the area of friendly/enemy discrimination in the battlefield.

One program introduced to reduce such friendly fire casualty rates was the Battlefield Combat Identification System or BCIS. BCIS was used by both ground and air forces. Based on radar technology, a small transmitter and receiver was provided to every combat vehicle in the US Army. The device received and sent signals that identified itself to friendly forces. While this system would be effective for vehicles, it is not suitable for individual soldiers and is costly. It could cost as much as $40,000 per vehicle for the system.

Other systems, also based on wireless technology, such as that disclosed in, U.S. Pat. No. 4,851,849 and U.S. Pat. No. 4,694,297, offer a different solution. However, all of these alternatives are quite costly on a per unit basis and do not offer a solution which can be easily deployable or be deployable to the single soldier level. None of these systems can also be deployable on ordnance. Such ordnance, once launched, cannot be aborted. Thus, a targeting error can lead to tragic results.

A solution is needed that is cost-effective, easily deployable and, ideally, deployable on individual soldiers. Such a solution should also be capable of being deployed on ordnance to avoid human error and misidentification by combatants such as pilots. This would avoid such tragic incidents as the bombing of Canadian soldiers by the US Air Force in Afghanistan in 2002 and the bombing of allied Kurdish fighters and US Special Forces troops, again, by the US Air Force in 2003.

One possible problem with optics-based solutions in their use in broad daylight. The brightness of sunlight can overpower most optics based solutions such as that disclosed in U.S. Pat. No. 5,966,227. Specifically, detecting a return optical signal can be difficult as the return optical signal can get overwhelmed by sunlight. It is therefore an object of the present invention to mitigate if not overcome the shortcomings of the prior art.

SUMMARY OF THE INVENTION

The present invention provides an optical based identification system that is easily deployable and can be used in broad daylight. Fluorescent semiconductor nanocrystals (quantum dots) that fluoresce at specific wavelengths are distributed in a suitable polymer. The resulting mixture can then be applied as paint or on an adhesive label for application to a portion of any equipment or member of a friendly unit. The system also has a corresponding detection processing unit which may be mounted on ordnance or on any other equipment such as aircraft. The detection unit uses a laser, which when active, causes a laser beam to strike the paint or adhesive able applied to the friendly unit. This causes the quantum dots to fluoresce. The fluorescence of the quantum dots can be detected by the sensor portion of the detection/processing unit. The sensor portion then transmits the data generated by the detected fluorescence to a data processing unit. The unit can then send a corresponding signal to the equipment operator or, if the unit is mounted on ordnance that has been launched to the warhead to deactivate the warhead. To overcome the effects of broad daylight on an optical system, the quantum dots are engineered to fluoresce at wavelengths corresponding to the absorption lines of the solar ultra-violet to the near infrared spectrum, more commonly known as Fraunhofer lines.

In a first aspect, the present invention provides a system for identity determination of a subject, the system comprising:

coating means applied to said subject, said coating means fluorescing when activated by an activating optical beam;

optical beam means for providing said activating optical beam;

receptor means for detecting fluorescence of said coating means fluoresces;

data processing means for processing data derived from fluorescence of said coating means by way of said receptor means, wherein said fluorescence of said coating means has encoded thereon at least one identification code identifying said object.

In a second aspect, the present invention provides an identification coating to be applied to a surface, said coating comprising:

fluorescent semiconductor nanocrystals which fluoresce at specific wavelengths, at least one of said specific wavelengths corresponding to a wavelength of an absorption line in the sun's ultra-violet to near infrared spectrum;

a polymer in which said nanocrystals are distributed.

In a third aspect, the present invention provides a subsystem for use in an optical identification system, the subsystem comprising:

an optical activation beam delivery means for delivering an optical activation beam to an identification coating which fluoresces when activated by said optical activation beam;

optical sensor means for detecting a fluorescence of said identification coating and for transmitting data related to said fluorescence;

data processing means for receiving data from said optical sensor means, said data processing means processing said data to retrieve encoded identification data encoded in said fluorescence, wherein said fluorescence is related to absorption lines of an optical spectrum of the sun.

BRIEF DESCRIPTION OF THE DRAWINGS

A better understanding of the invention will be obtained by considering the detailed description below, with reference to the following drawings in which.

DETAILED DESCRIPTION

Figure 1:
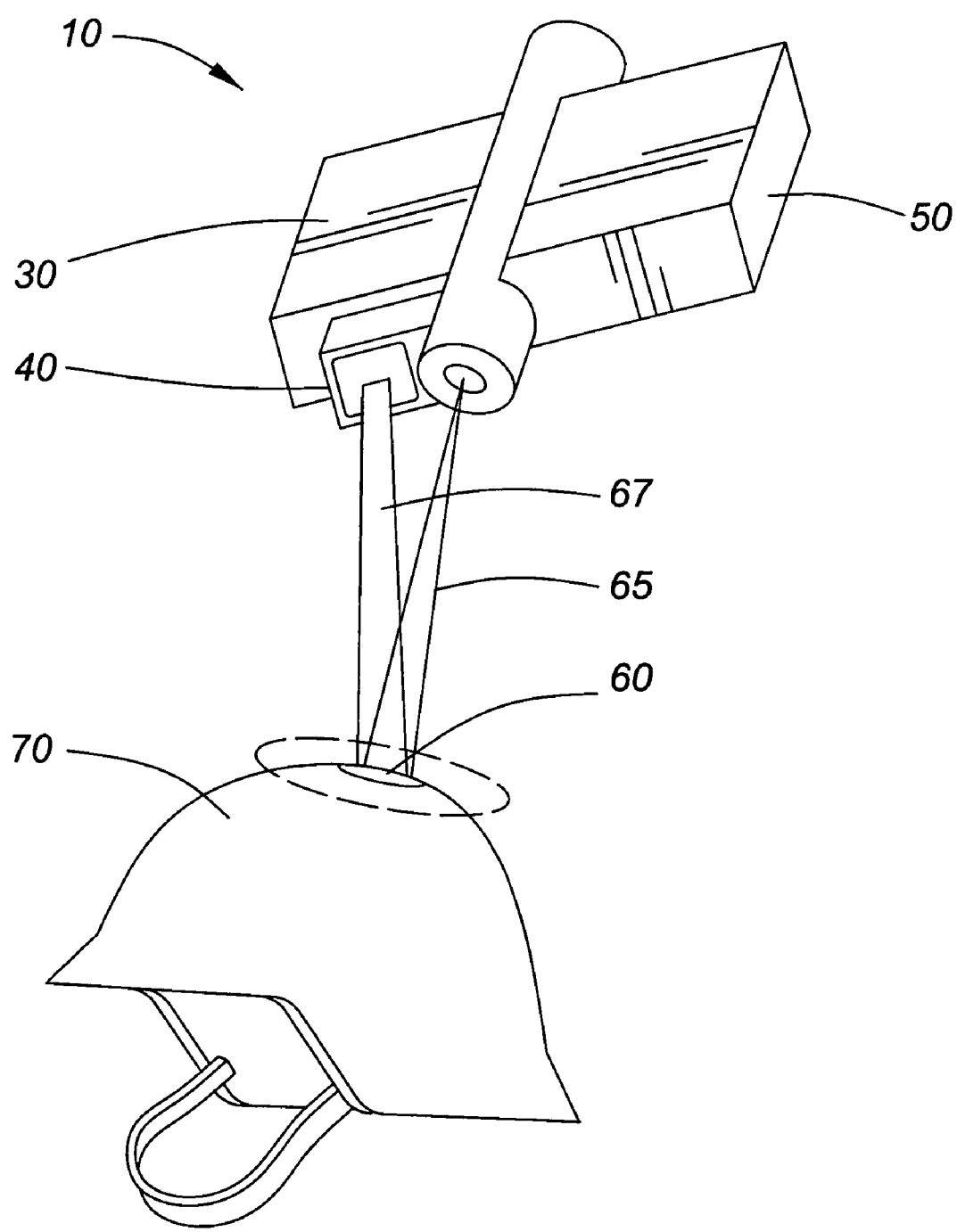
FIG. 1 illustrates an identification system according to one embodiment of the invention.

Referring to FIG. 1, a partial optics based identification system 10 is illustrated. The partial system 10 has a laser 20, a spectrum sensor 30, a spectral filter 40, and a data processing module 50. The rest of the system consists of a coating 60 deposited on a piece of equipment 70, in this case a military combat helmet.

The system functions with the laser 20 providing an optical beam 65 which hits the coating 60. This causes the coating to fluoresce and emit a corresponding electromagnetic radiation (fluorescence) 67. The radiation 67 is picked up by the spectrum sensor 30 after being filtered by the spectral filter 40. The spectrum sensor 30 then transmits what is detected to the data processing module 50. The data processing module 50 then processes or decodes any data encoded in the fluorescence. Based on the decoded data, the data processing module 50 may then send an appropriate signal to an external module or to an end user.

To overcome the issue of sunlight overpowering the fluorescence such that the spectrum sensor 30 cannot detect the fluorescence, the electromagnetic radiation that makes up the fluorescence should correspond in wavelength to the absorption lines in the sun's ultra-violet to near infrared spectrum. These lines, known as Fraunhofer lines, are a result of the absorption of light by the elements in the sun. While the sun releases essentially a complete spectrum of wavelengths, the elements in the sun absorb some wavelengths. Light having these wavelengths which have been absorbed by the sun's elements therefore do not reach the observer. As such, the spectrum of the light reaching Earth from the sun has "gaps" at very specific wavelengths and these "gaps" manifest themselves as dark lines in the sun's spectrum. Known collectively as Fraunhofer lines, there are literally thousands of such Fraunhofer lines scattered in various wavelengths ranging from the ultra-violet to the near infrared. By selecting a coating which fluoresces at wavelengths that correspond to selected, predetermined Fraunhofer lines, the sun will be incapable of overpowering the fluorescence emitted by the coating.

Figure 2:
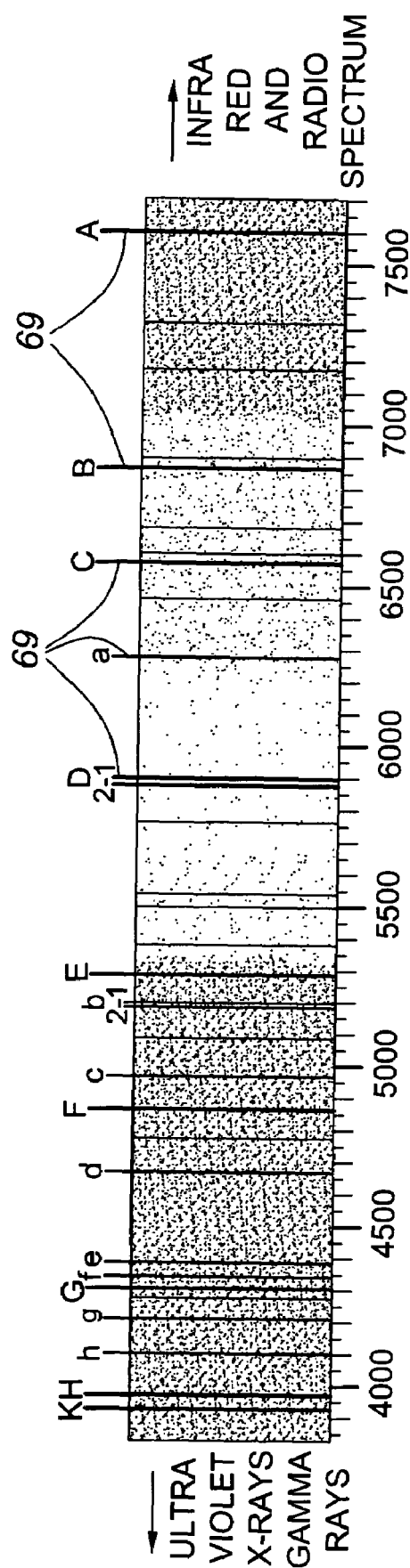
FIG. 2 illustrates the visible spectrum of the sun showing the different Fraunhofer lines.

FIG. 2 illustrates the sun's visible spectrum. The spectrum illustrated ranges from the ultraviolet to the near infrared. As can be seen, numerous lines 69 are present. These Fraunhofer lines may be used as the information coding vectors. If the coating fluoresces at wavelengths corresponding to these lines, the intensity of sunlight will be insufficient to overpower the fluorescence. It has been found that the strongest absorption lines in the solar spectrum are as follows:

| Strongest Absorption Fraunhofer Lines in the Solar Spectrum | | | | | | | |
|---|---|---|---|---|---|---|---|
| 759.4–762.1 | 686.7–688.4 | 656.28 | 627.6–628.7 | 589.592 | 589.595 | 587.56 | 526.95 |
| 518.36 | 517.27 | 516.89 | 516.74 | 516.73 | 495.76 | 486.13 | 466.81 |
| 438.35 | 434.05 | 430.79 | 430.77 | 422.67 | 410.17 | 396.84 | 393.37 |

*wavelength (nm)

Fluorescent semiconductor nanocrystals, more commonly referred to as quantum dots, is a suitable medium which is used in the abovementioned coating. Semiconductor nanocrystals quantum dots, as the name implies, are tiny crystals composed of the IIB-VIA, IIIA-VA, or IVA-VIA semiconductor materials that range in size from one to one hundred nanometers or roughly 10 to several hundred atoms.

Quantum dots are generally prepared via sophisticated solution chemical processes and stored in specific solvent to prevent aggregation and precipitation. To be able to use quantum dots for the spectral coding on surfaces of metal (such as tanks and/or helmets), plastics and other materials, a paintable or printable quantum dots/polymer/solvent (info-ink) is needed.

Figure 3:
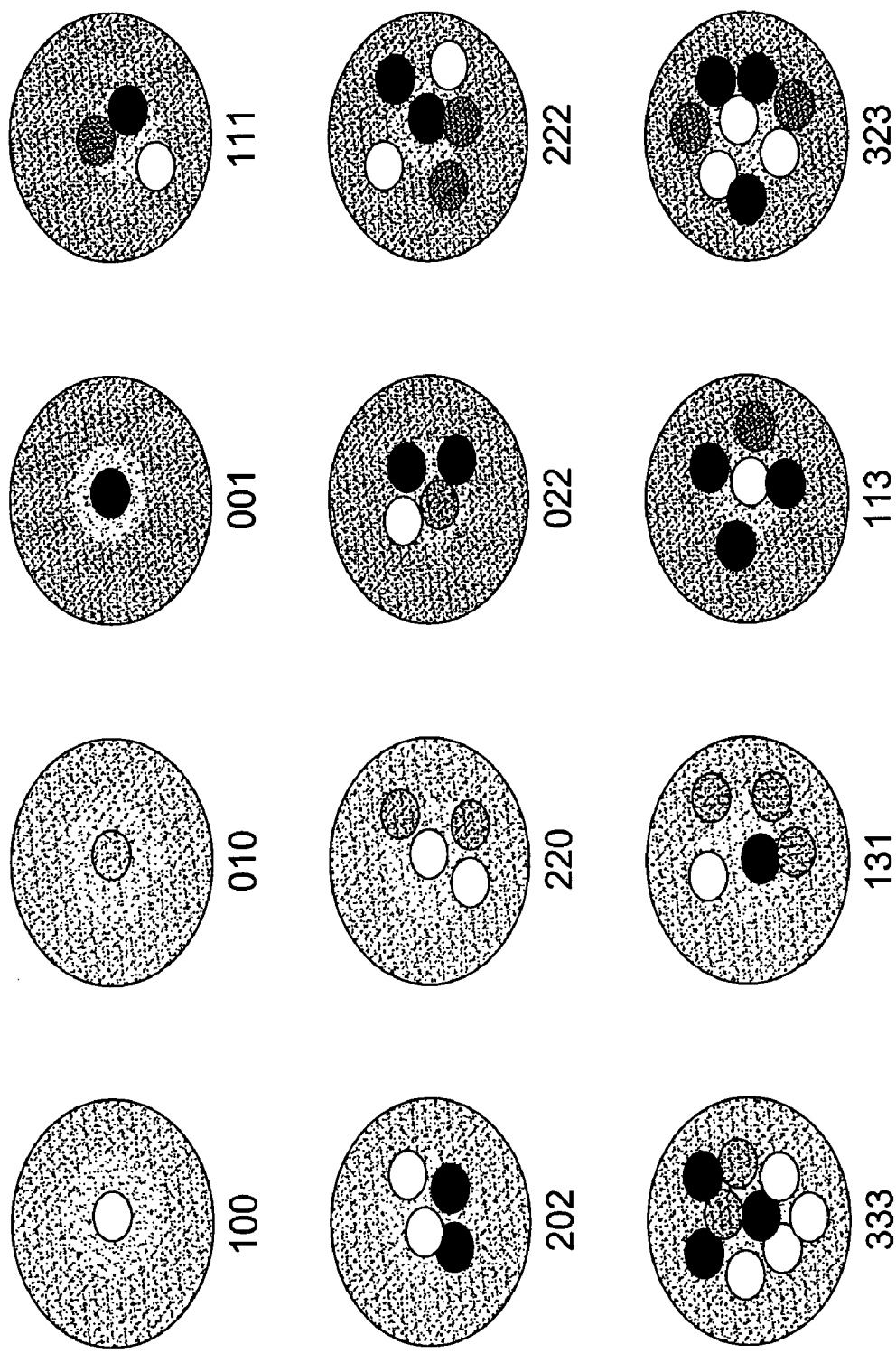
FIG. 3 schematically illustrates some designed samples of info-ink with three different quantum dots with different emission wavelengths and how they can be used to encode data.

The quantum dots with different wavelengths provides a great number of combination of wavelength and intensity, for example, an encoder using 6-wavelength/10-intensity quantum dot beans has a theoretical coding capacity of about one million discrimination codes. FIG. 3 illustrates schematically the designed samples of info-inks consisting of three different quantum dots with different emission wavelengths. Adjusting the amount of the quantum dots can produce a series of 3-digital codes.

The info-inks consisting of polymer, solvent, multiple quantum dots and other additives are prepared to make the info-inks on the objects that need to be coded. The info-ink consists of fluorescent semiconductor nanocrystals or quantum dots, a polymer or blend of polymers, solvent and other additives. Quantum dots used in this info-ink are semiconducting materials, preferably but not limited to, those from the Group IIB and Group VIA in the periodic table of elements, such as cadmium selenide (CdSe), cadmium sulfide (CdS), zinc selenide (ZnS) and zinc sulfide (ZnS). Quantum dots of info-ink have diameters ranging from one nanometer to one hundred nanometers. The emission of quantum dots can cover the whole visible range and near-infrared range (from 400 nm to 3000 nm). For the same materials system, the smaller the quantum dot, the shorter the fluorescent wavelength. For example, CdSe quantum dots with a nominal diameter of 2.8 nm show a fluorescence at 535 nm, while quantum dots of 5.6 nm CdSe crystals have an emission centered at 640 nm quantum dots of lead selenide of various diameters can emit fluorescence in the near-infrared range. Quantum dots be made from single semiconducting materials and from a pair of materials in the core-shell configuration. For example, the core composition can be CdSe and the shell composition can be ZnS. Such core-shell structured quantum dots have higher emission efficiency and better chemical stability than the single composition quantum dots.

Polymers are used in the info-ink as matrix materials, in which the quantum dots with different emission wavelengths are distributed homogeneously. The polymers should not have a quenching effect on the fluorescence of quantum dots. They also need to meet other requirements such as solubility in selected solvents, long-term environmental stability, good compatibility and miscibility with quantum dots. Solvents used in the formulation of the info-ink include aqueous and non-aqueous solvents, but are preferably non-aqueous solvents. For example, toluene is employed as a solvent to make CdSe (mixture of different diameters)/PS info-ink. A mixture of solvents can be used to improve the properties such as solubility, viscosity, volatility, storage stability and adhesion etc. Additives are chemical compounds, which are used in the info-ink to improve certain properties, such as viscosity and adhesion, without influencing the major fluorescent property. The formulated system that would contain the quantum dots along with other materials such as solvents and polymers would provide an easier to use medium for this aspect of the invention.

In order to code the objects automatically and fast, the principal-ink should be prepared first. A principal-ink is an info-ink that has a unique fluorescent wavelength. For applications using 6 wavelengths, 6 principal-inks are needed. Controlled by a computer, a printer will mix these principal-inks to form a coded info-ink which contains the ID information of an object.

Figure 4:
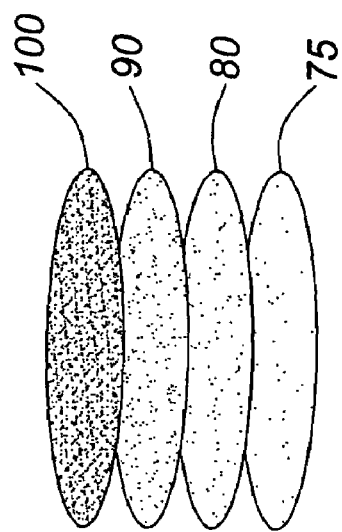
FIG. 4 illustrates the different layers in a coating according to another embodiment of the invention.

The coating with the coded quantum dot/info-ink layer may be applied using a 4 layer configuration as shown in FIG. 4. A substrate 75 provides material that adheres to the surface and, ideally, also provides the material that can reflect the fluorescent light. The quantum dot info-ink layer 80 contains the quantum dot coating with the encoded information. The filter layer 90 provides a filter which only allows the optical beam 65 (the exciting beam) and the fluorescence to pass through—this will prevent ambient light from exciting or causing the coating to fluoresce. A protecting layer 100 protects the coating from scratching or staining. The protecting layer is made of a polymer material which may differ from the polymer matrix material. The 4 layer configuration may be implemented as a single side adhesive label or as a paint. The labels may be attached to any suitable surface such as the surface of a helmet or the surface of any equipment painted on any surface. Other layers may be painted on top of the encoded info-ink layer to protect the coating.

To encode information using the Fraunhofer lines, specific wavelengths of light may be used in a binary manner to encode data. As an example, if wavelengths A, B, C, D and E correspond to the wavelengths of specific Fraunhofer lines, then the info-ink in the coating may be configured to have any combination of the 5 wavelengths. Thus, if one coating only fluoresced radiation at wavelengths A, B, C, and E, then this can be seen as having encoded the binary data 11101, the 0 corresponding to the absence of wavelength D. Similarly, a coating which only fluoresced wavelengths B, D and E would have the binary data 01011 encoded within it. It should be noted that the above scheme is provided only as an example and is not meant to be interpreted as the only method by which data may be encoded in the identification system described in this document.

The recovery of the information encoded in the coating is accomplished through the use of the components illustrated in FIG. 1. The laser 20 provides a broadband optical beam that excites the coating and causes it to fluoresce. The fluorescence is detected by the spectrum sensor 30. To simplify the system, spectral filter 40 only allows in electromagnetic radiation that is expected—only wavelengths corresponding to the Fraunhofer lines are allowed through the filter. The spectrum sensor 30 then detects whichever electromagnetic radiation is allowed to pass and data as to which wavelengths were detected is then passed to the data processing module 50. The data processing module 50 then interprets this data and determines what signal to transmit to the ultimate end user. As an example, if the data processing module 50 determines that binary data 11101 is expected but binary data 01011 is received, then it may decide, depending on its programming, to clarify the target as unfriendly.

The system described above may be used in many ways. The optical beam means (the laser 20 in FIG. 1) need not be in the same location as the rest of the system. A remote laser designation, such as that currently used in the targeting of laser guided munitions, may also be used. The system may also be deployed in aircraft to assist pilots and bombardiers in differentiating friendly forces from unfriendly forces. Also, the whole identification retrieval system, as illustrated in FIG. 1, may be mounted on ordnance. Once the ordnance is launched the identification retrieval system will keep the warhead on the ordnance informed as to whether the target is friendly or not. If the target is designated as friendly, the warhead may be deactivated prior to impact on the target. The system may also be deployed on ground based vehicles such as tanks and other armoured vehicles. Such a system would assist soldiers in identifying and differentiating between and unfriendly forces.

For the data processing module to properly extract the information from the data gathered by the spectrum sensor, the data must first be processed. This is done two steps:

1) Preprocessing step: removing the noise by a digital filter, and separating the spectral lines in the spectrum by a de-convolution.

2) Decoding step: finding the positions and intensities of all the spectral lines, and decoding the original data according to a known prior codebook.

A spectrum function of info-ink can be described as:

$$f(\lambda) = \sum_{i=1}^{N} k_i \cdot \delta(\lambda - \lambda_i) \otimes p(\lambda_i) \qquad (1)$$

where $\delta(\lambda)$ represents an impulse function, physically, a spectral line, $k_i$ is the intensity of a $\delta(\lambda)$ at $\lambda_i$, $p(\lambda_i)$ denotes the profile functions entered at $\lambda_i$, $\otimes$ represents a convolution operation. As described above, the relatively broad wavelength profile of the info-ink is the main reason for the spectrum alias. To get rid of the alias effect, the spectrum line must be separated.

The Fourier transform FT[], of Eq. (1) is given by $$FT[f(\lambda)] = \sum_{i=1}^{N} k_i \cdot FT[\delta(\lambda - \lambda_i)] \cdot FT[p(\lambda_i)], \qquad (2)$$

$$F(u) = \sum_{i=1}^{N} k_i \cdot D_i \cdot P_i$$

Because the $f(\lambda)$ or $F(u)$ is the measured input data, $FT[f(\lambda)]=F(u)$ and all the $p(\lambda_i)$s or $P_i$s are known functions, the accurate non-profile spectral line at $\lambda_m$ can be restored by $$F(u)/P_m = \sum_{i=1}^{m-1} k_i \cdot D_i \cdot P_i/P_m + k_m \cdot D_m + \sum_{i=mi}^{N} k_i \cdot D_i \cdot P_i/P_m \qquad (3)$$

Equation 3 is a de-convolution-based operation performed in spectrum domain. The separated spectrum line at $\lambda_m$ is obtained by the Inverse Fourier Transform (IFT) of Eq 3:

$$IFT[F(u)/P_m] = \qquad (4)$$
$$IFT\left[\sum_{i=1}^{m-1} k_i D_i P_i/P_m + \sum_{i=m+1}^{N} k_i D_i P_i/P_m\right] + k_m \delta(\lambda - \lambda_m)$$

When all the $P_i$s are the same, i.e. $P_i=P_m$, Eq. 4 becomes $$IFT[F(u)/P_m] = \sum_{i=1}^{N} k_i \delta(\lambda - \lambda_i) \qquad (5)$$

The above Eq. 5 yields a serial of $\delta(\lambda)$s, indicating that all the spectral lines are extracted and separated as individual impulses. However, as each spectrum profile of info-ink is actually different from others, the de-convolution operation can only extract one narrow sharp impulse, like the $k_m\delta(\lambda-\lambda_m)$ in Eq. 4. To find all spectral lines, $k_i\delta(\lambda-\lambda_i)$ i=1 N, N time operations are needed.

A person understanding this invention may now conceive of alternative structures and embodiments or variations of the above all of which are intended to fall within the scope of the invention as defined in the claims that follow.

What is claimed is:

1. A system for identity determination of a subject in sunlight, the system comprising:
    coating means applied to said subject, said coating means fluorescing when activated by an activating optical beam;
    optical beam means for providing said activating optical beam;
    receptor means for detecting fluorescence of said coating means when said coating means fluoresces;
    data processing means for processing data derived from fluorescence of said coating means by way of said receptor means,
wherein
    said fluorescence of said coating means has encoded thereon at least one identification code identifying said object,
and wherein said coating means fluoresces at wavelengths which correspond to a wavelength of at least one Fraunhofer line in the solar spectrum such that fluorescence of said coating means is detectable by said receptor means in sunlight, wherein said fluorescent semiconductor nanocrystals fluoresces at different wavelengths, at least one of said different wavelengths corresponding to a wavelength of a Fraunhofer line in a spectrum of the sun, at least one of said different wavelengths corresponding to a wavelength selected from a group comprising: 686.7–688.4 nm, 656.28 nm, 627.6–628.7 nm, 589 . . . 592 nm, 589.595 nm, 587.56 nm, 526.95 nm, 518.36 nm, 517.27 nm, 516.89 nm, 516.74 nm, 516.73 nm, 495.76 rim, 486.13 nm, 466.81 nm, 438.35 nm, 434.05 nm, 430.79 nm, 430.77 nm, 422.67 nm, 410.17 nm, 396.84 nm, and 393.37 nm.

2. A system according to claim 1 wherein said coating means comprises fluorescent semiconductor nanocrystals, and at least one suitable polymer in which said nanocrystals are distributed.

3. A system according to claim 2 wherein said coating means further comprises at least one suitable solvent.

4. A system according to claim 1 wherein said coating means is applied to said subject as a paint.

5. A system according to claim 3 wherein said coating means is applied to said subject as an adhesive label, said coating means being deposited on said adhesive label prior to said label being attached to said subject.

6. A system according to claim 1 wherein said receptor means includes at least one optical filter which only allows specific wavelengths of optical radiation to pass through, said specific wavelength of optical radiation corresponding to wavelengths of said Fraunhofer lines.

7. A system according to claim 6 wherein said receptor means includes a spectrum sensor.

8. A system according to claim 1 wherein said optical beam means is a laser.

9. A system according to claim 2 wherein said data processing means extracts said at least one identification code from said fluorescence.

10. A system according to claim 9 wherein said data processing means generates a specific signal depending on a result of processing said at least one identification code.

11. A subsystem for use in an optical identification system, the subsystem comprising:
    an optical activation beam delivery means for delivering an optical activation beam to an identification coating which fluoresces when activated by said optical activation beam;
    optical sensor means for detecting a fluorescence of said identification coating and for transmitting data related to said fluorescence;
    data processing means for receiving data from said optical sensor means, said data processing means processing said data to retrieve encoded identification data encoded in said fluorescence,
wherein said fluorescence is related to Fraunhofer lines of an optical spectrum of the sun. Such that said fluorescence is detectable by said optical sensor means in sunlight ;wherein said specific wavelengths include at least one wavelength corresponding to a Fraunhofer line of the sun, at least one of said specific wavelengths corresponding to a wavelength selected from a group comprising: 686.7–688.4 nm, 656.28 nm, 627.6–628.7 nm, 589 . . . 592 nm, 589.595 nm, 587.56 nm, 526.95 nm, 518.36 nm, 517.27 nm, 516.89 nm, 516.74 nm, 516.73 nm, 495.76 nm, 486.13 nm, 466.81 nm, 438.35 nm, 434.05 nm, 430.79 nm, 430.77 nm, 422.67 nm, 410.17 nm, 396.84 nm, and 393.37 nm.

12. A subsystem according to claim 11 wherein said optical sensor means includes a spectrum sensor.

13. A subsystem according to claim 11 wherein said optical sensor means includes a spectral filter which only allows radiation of specific wavelengths to reach said spectrum sensor.

14. A subsystem according to claim 11 wherein said optical activation beam delivery means is a laser.

* * * * *